United States Patent
Pöchmüller

(10) Patent No.: US 6,677,986 B1
(45) Date of Patent: Jan. 13, 2004

(54) METHOD AND DEVICE FOR DETERMINING LIGHT CONDITIONS IN FRONT OF A MOVING OBJECT, IN PARTICULAR A MOTOR VEHICLE

(75) Inventor: Werner Pöchmüller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,850

(22) PCT Filed: Oct. 2, 1998

(86) PCT No.: PCT/DE98/02936

§ 371 (c)(1),
(2), (4) Date: Jun. 14, 2000

(87) PCT Pub. No.: WO99/17954

PCT Pub. Date: Apr. 15, 1999

(30) Foreign Application Priority Data

Oct. 2, 1997 (DE) .......................................... 197 43 580

(51) Int. Cl.⁷ ................................................. H04N 9/47
(52) U.S. Cl. ...................................................... 348/149
(58) Field of Search ................................ 348/148, 149, 348/221.1, 223.1, 227.1, 116, 118; 315/82, 83, 155

(56) References Cited

U.S. PATENT DOCUMENTS

| 4,645,975 | A | * | 2/1987 | Meitzler et al. ............... 315/82 |
| 4,692,798 | A | | 9/1987 | Seko et al. |
| 4,970,653 | A | * | 11/1990 | Kenue ..................... 364/461 |
| 4,985,816 | A | | 1/1991 | Seko et al. |
| 5,331,251 | A | * | 7/1994 | Marois ........................ 315/82 |
| 5,555,312 | A | * | 9/1996 | Shima et al. ............... 382/104 |
| 5,789,737 | A | * | 8/1998 | Street ....................... 250/208.1 |
| 5,880,782 | A | * | 3/1999 | Koyanagi et al. ........... 348/364 |
| 5,933,190 | A | * | 8/1999 | Dierickx et al. ............ 348/302 |
| 6,049,747 | A | * | 4/2000 | Nakajima et al. ............. 701/45 |
| 6,101,294 | A | * | 8/2000 | McCaffrey et al. ......... 382/312 |

FOREIGN PATENT DOCUMENTS

| DE | 29 46 561 | 5/1981 |
| DE | 195 23 262 | 1/1997 |
| EP | 0 736 414 | 10/1996 |
| FR | 2 726 144 | 4/1996 |
| JP | 60 240545 | 11/1985 |
| WO | WO 97 35743 | 10/1997 |

* cited by examiner

Primary Examiner—Nhon Diep
(74) Attorney, Agent, or Firm—Kenyon & Kenyon

(57) ABSTRACT

Method for determining the lighting conditions in front of a moving object, in particular in front of a motor vehicle. The arrangement includes a sensor unit which scans the area in front of the vehicle in the direction of vehicle travel as well as an evaluation unit which measures both the general lighting conditions and the lighting conditions in front of the vehicle in the direction of vehicle travel based on the values supplied by the sensor unit. The brightness measurement is carried out with a two-dimensional image sensor, and one or more information values relating to the lighting conditions, for example before entering a tunnel, is generated with the help of a sectoral and/or global evaluation of the brightness values measured by the image sensor in the respective sectors used on a traffic lane between the edges of the traffic lane.

12 Claims, 2 Drawing Sheets

METHOD AND DEVICE FOR DETERMINING LIGHT CONDITIONS IN FRONT OF A MOVING OBJECT, IN PARTICULAR A MOTOR VEHICLE

BACKGROUND INFORMATION

The present invention relates to a method for monitoring and estimating the lighting conditions in front of a moving object in particular in front of a motor vehicle, In German Published Patent Application No. 195 23 262, a sensor system and an evaluation system are provided to automatically switch lighting units in vehicles. The sensor system has at least one non-directional global sensor that captures the general lighting conditions around the vehicle and at least one directional sensor that captures the lighting conditions in front of the vehicle in the direction of vehicle travel. Based on the signals from the global sensor, the evaluation system can detect a change in the general lighting conditions around the vehicle, for example in twilight, and can turn the lighting units on or off. Based on the signals from the directional sensor, the evaluation system can detect a tunnel or underpass located in front of the vehicle in the direction of vehicle travel and turn the lighting units on in good time before entering the tunnel or underpass.

The disadvantage of this arrangement is the fact that the separate ambient and directional sensors tend to make the system more complex. Photocells to which the incident light is supplied with the help of optical concentrators are used as the light-sensitive elements. This makes the arrangement dependent on shutters and exposure times.

A method in which a vehicle is provided with a side-mounted optical scanning system to provide non-contact scanning of the side road area is described in European No. 0736 414. An evaluation unit is connected downstream from the scanning system. The optical scanning unit includes multiple infrared transmitting elements, arranged side-by-side, and a corresponding CCD array for scanning the road surface to detect the edge of a traffic lane. The evaluation unit is configured to determine runtime and contrast and to detect contours based on the data supplied by the scanning system.

A significant disadvantage that arises when using CCD sensors or even linear CMOS sensors to measure brightness is the fact that they can capture only a limited range of brightness dynamics. As a result, they are provided with electronic or mechanical exposure time controllers and shutters. This makes it impossible to use the signal measured at the sensor output for absolute brightness measurement because the exposure time and shutter position, respectively, should always be taken into account.

The object of the present invention is to considerably simplify the determination of lighting conditions in front of a moving object, in particular in front of a vehicle, so that suitable measures can be taken for the manual or automatic operation of the lights in front of the moving object according to the situation.

SUMMARY OF THE INVENTION

The method according to the present invention has an advantage in that it can considerably reduce the mechanical and electrical complexity in determining lighting conditions in the direction of movement in front of a moving object such as, in particular, a vehicle. This is generally achieved with a considerable reduction in the cost of the overall system. The sectoral brightness measurement that this affords vastly increases flexibility.

In the method according to the present invention for determining the lighting conditions in front of a moving object, in particular in front of a vehicle, the brightness measurement is, in principle, carried out with a two-dimensional image sensor, and one or more information values relating to the lighting conditions is generated with the help of a sectoral and/or global evaluation of the brightness values measured by the image sensor in the respective sectors used.

In one particularly advantageous embodiment of the method according to the present invention, a CMOS image sensor is used as the image sensor for the two-dimensional brightness measurement. It is suitable to use an image sensor with a non-linear conversion characteristic to make the best possible use of the existing, frequently quite narrow, current and voltage ranges involved in the high dynamics of light incidence.

In a further particularly advantageous embodiment of the method according to the present invention, a logarithmic image sensor is used for measuring brightness.

In a further suitable embodiment of the method according to the present invention, the brightness is measured by averaging pixel brightness in measurement windows.

In a further particularly suitable embodiment of the present invention, the brightness measurement is combined with an automatic traffic lane tracking system to selectively measure ambient brightness in the path of the traffic lane.

A further advantageous embodiment provides an arrangement for detecting objects, making it possible to eliminate, for example, large trucks traveling a short distance in front of the vehicle in the sectoral brightness measurement.

The arrangement for carrying out the method according to the present invention principally includes a two-dimensional image sensor, onto which the area in front of the vehicle can be or is mapped. A CMOS image sensor, which, in a particularly suitable embodiment, can be a logarithmic image sensor, is advantageously provided as the two-dimensional image sensor. In another embodiment, an image sensor that generally has an advantageous, non-linear conversion characteristic can also be provided.

The method according to the present invention or the arrangement according to the present invention is preferably used, in particular, to give the driver of a vehicle advance warning and alert him to the need to turn on the vehicle lights; alternatively, the method and/or the arrangement is used to automatically activate the vehicle lights in advance, in particular to turn them on and possibly also off again. This makes it possible to respond to tunnel entrances and exits as well as underpasses according to the situation.

The method according to the present invention or the arrangement according to the present invention is also preferably used, in particular, to alert the driver of a vehicle to the need to turn the vehicle lights on and off based on the ambient brightness measured by the two-dimensional image sensor; alternatively, the method and/or the arrangement is used to automatically activate the vehicle lights, in particular to turn them on and possibly also off again, also based on the ambient brightness measured by the two-dimensional image sensor. This makes it possible to respond to global brightness variations caused by daylight, nightfall, cloud cover, twilight, etc.

DETAILED DESCRIPTION

Figure 1:
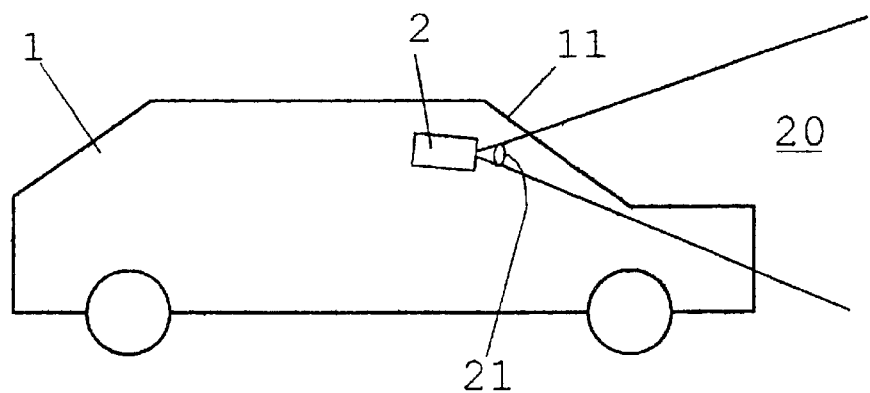
FIG. 1 shows a schematic representation of a vehicle having an image sensor that senses the area in front of the vehicle in the direction of vehicle travel.

FIG. 1 shows a schematic representation of a vehicle 1 having an image sensor 2 that senses area 20 in front of the vehicle in the direction of vehicle travel. The schematic representation illustrated in FIG. 1 shows a cross-section along the longitudinal vehicle axis and a preferred location for attaching image sensor 2. The latter is advantageously provided as high as possible behind windshield 11 in a way that provides a good view of the traffic scene in area 20 in front of vehicle 1 in the direction of vehicle travel, while image sensor 2 is also located within the active area of the windshield wipers. The traffic scene in area 20 in front of vehicle 1 in the direction of vehicle travel is preferably mapped onto the light-sensitive surface of planar, i.e. two-dimensional, image sensor 2 by a lens arrangement 21.

Figure 2:
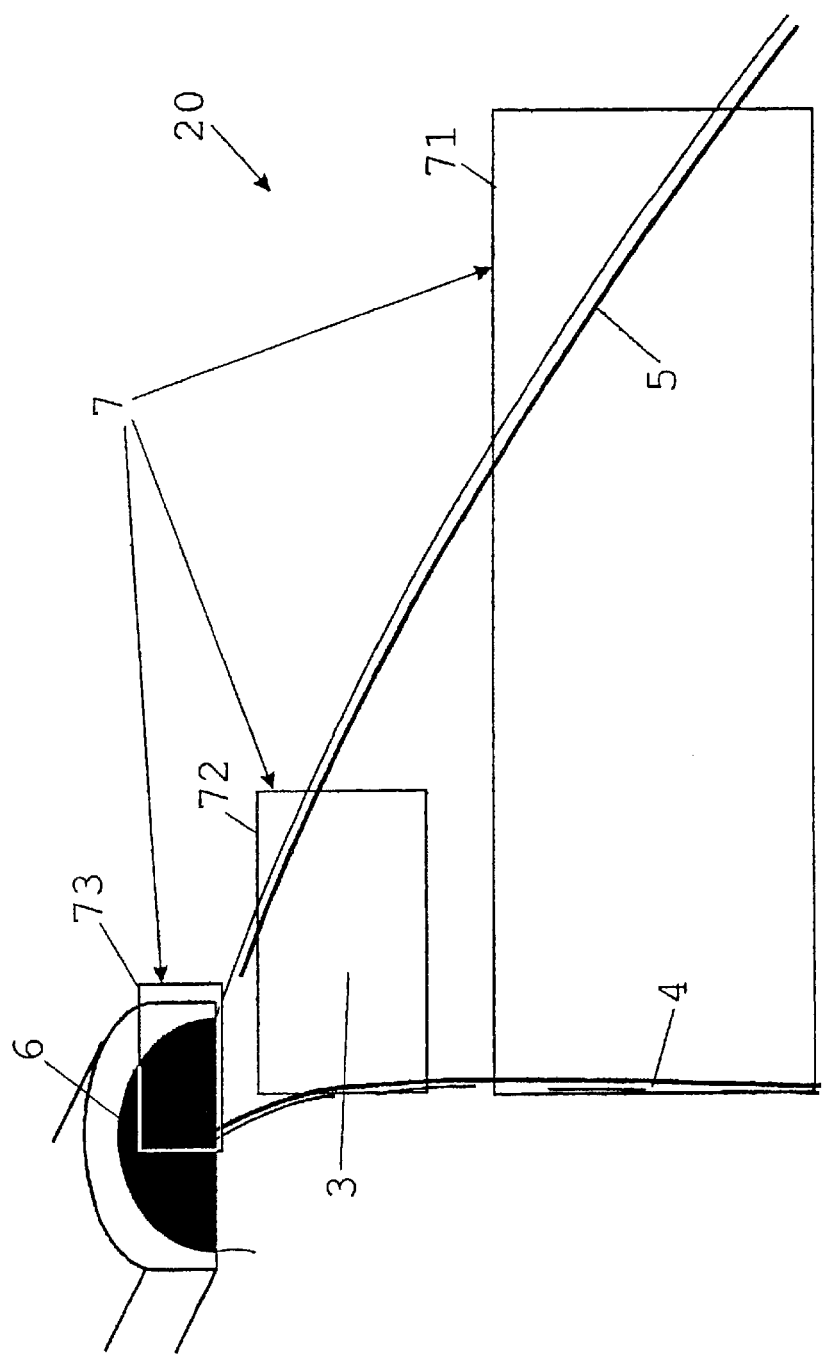
FIG. 2 shows a schematic sketch of the scene in front of a vehicle before the vehicle enters a tunnel.

FIG. 2 shows a schematic sketch of area 20 located in front of vehicle 1, representing a particular scene prior to entering a tunnel 6. The traffic lane in front of the vehicle is identified by reference number 3, and its edges, i.e. limits, by reference numbers 4 and 5. In the right half of the entrance, the lane opens into tunnel 6. During the day, only a low ambient brightness is measured in the tunnel entrance area. According to one particular feature of the present invention, area 20 in front of the vehicle, in particular the traffic lane path in this area, is divided into special measurement fields 7 which are placed in different locations. These include, for example, a large global measurement field 71 right in front of the vehicle, a measurement window 72 largely directed onto traffic lane 3 at a medium distance, and a measurement window 73 directed at a greater distance and used to sense the entrance to tunnel 6.

Figure 3:
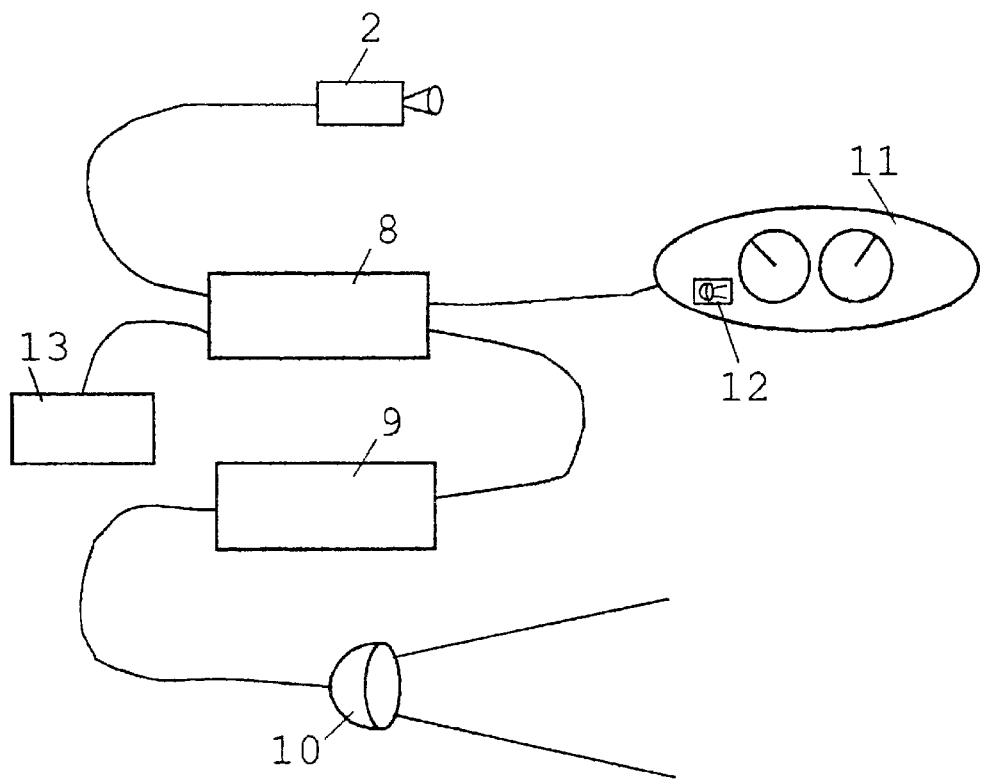
FIG. 3 shows a schematic block diagram of the components contained in the overall system.

FIG. 3 shows a schematic block diagram of the main components contained in the overall system. The overall system can be used in two different ways. The one basic application involves alerting the vehicle driver to the need to turn the vehicle lights on and off, respectively. The other fundamental application involves automatically activating the vehicle lights, in particular turning them on and possibly also off again.

Image sensor 2 supplies signals relating to the visual appearance of the traffic scene in front of the vehicle. These signals are supplied to a suitable evaluation unit 8. The latter generates the parameters needed for alerting the driver and controlling the lights, respectively, based on these signals. These parameters may be traffic lane path, ambient brightness, brightness variation along road surface 3, or even objects of a specific type in the road path, particularly directly in front of vehicle 1. Suitable algorithms and calculation methods, like those used in image processing, are used to calculate these parameters. One of the signals calculated and generated in this manner is a signal to turn the vehicle lights on and off, respectively, and is provided to a lighting control unit 9. This lighting control unit 9 switches the lighting unit, represented by a headlight 10, according to the signal supplied. Another of the signals calculated and generated in this manner is a signal for alerting the driver. This signal can be generated as an alternative or in addition to the automatic switching signal. This signal produces a suitable driver warning indication or driver information on a man-machine interface, such as, in particular, an instrument panel 11 with a lighting status indicator 12. This alerts the driver to the need to turn his lights on or off. In addition to the image information for image evaluation to measure brightness and also possibly to detect the traffic lane, evaluation unit 8 can expediently also receive information signals via other sensors that are generally identified by reference number 13. These signals can provide information, for example, about the vehicle speed.

According to the present invention, a two-dimensional, i.e. planar, image sensor is used for image sensor 2. A two-dimensional, i.e. planar, image sensor of this type includes a multiplicity of individual brightness sensors arranged side-by-side on a plane. Certain points in the vehicle surroundings, particularly in area 20 in front of the vehicle, are mapped onto specific receptors—the individual brightness sensors of image sensor 2—producing a visual impression of the vehicle surroundings. The ambient brightness can be measured on the basis of the ambient image generated in this manner. The total brightness of the monitored scene is determined by correspondingly processing the brightness signals of the individual receptors located within one of measurement windows 71, 72 or 73 of the difference scenes. The brightness can be measured in an especially suitable manner by averaging the pixel brightness, i.e. averaging the corresponding individual signals of the receptors located in the measurement window.

Through comparison with a threshold value, evaluation unit 8 determines whether or not the ambient brightness justifies illuminating the traffic lane by vehicle headlights 10. If headlights 10 are not turned on, the driver can receive the corresponding suitable signal, alerting him to the need to turn them on. If, on the other hand, they are turned on, the driver can receive a signal at a certain ambient brightness alerting him to the fact that the vehicle lights are no longer needed and he can turn headlights 10 off again. To avoid frequent contradictory indications, the threshold for determining whether the lights are turned on and off, respectively, should be described by a hysteresis.

Unlike individual brightness sensors, such as an individual photoelement, planar image sensor 2 provided according to the present invention permits a differentiated and sectoral brightness determination over the entire scene being monitored. This makes it possible to measure brightness in certain regions of the image by evaluating the signal of specific pixels. If the image sensor is positioned as shown in FIG. 1, it senses the area in front of vehicle 1. The course of travel that vehicle 1 will take can be predicted, particularly if image sensor 2 is combined with a traffic lane detection system according to one advantageous embodiment of the present invention. The illustration shown in FIG. 2 depicts the selective brightness measurement in areas along measured traffic lane 3. In the advantageous embodiment, the brightness values are measured in certain areas, image windows 71, 72, and 73, which are placed along traffic lane 3. It is not necessary for the measurement windows to be rectangular in shape. The brightness variation is advantageously measured by averaging the pixel brightness values within the individual measurement windows.

For example, it is possible to measure an excessively low brightness in measurement window 73, which lies directly in front of the entrance to tunnel 6, as shown in FIG. 2. It is therefore possible to request the driver to turn on his vehicle lights before entering tunnel 6. The vehicle lights can also be turned on automatically if the vehicle is equipped with a suitable mechanism. The lights should not be turned off too early, but rather only when adequate brightness can be measured in the areas of the scene directly in front of the vehicle. Detection can be improved by additional information from sensors 13, indicating, for example, the vehicle speed. Large measurement window 71, which extends over the entire scene, can be advantageously used to detect global brightness states, such as those caused, for example, by daylight, nightfall, twilight, cloud cover or even trees along the side of the road.

According to the present invention, the brightness measurement is therefore carried out with two-dimensional, i.e. planar, image sensor 2, and one or more information values relating to the lighting conditions is generated with the help of a sectoral and/or global evaluation of the brightness values measured by image sensor 2 in the respective sectors used, for example in measurement windows 71, 72, 73, e.g. using the individual receptors in the measurement windows. The sectoral brightness measurement obtained in this manner provides a great deal of flexibility.

The type of sectoral brightness measurement according to the present invention can be further improved by providing object detection. Image evaluation methods that have one or two simultaneously operating cameras can be used to detect objects located in front of the vehicle. For example, it is possible to determine that a large truck or another passenger car is traveling in front of or approaching the driver's own vehicle. Because the other vehicle may be very dark or very light in color, it could interfere with a global or even sectoral brightness measurement, particularly if the object is located a short distance in front of the driver's own vehicle and more or less completely fills area 20, thus occupying nearly the entire image area of image sensor 2. Object detection also makes it possible to correct the brightness measurement so that the focus is only on the area outside the detected object, thus avoiding measurement mistakes.

A CMOS image sensor is used as image sensor 2. It is very advantageous to use a logarithmic image sensor. A logarithmic variation of the light intensity/current or voltage conversion characteristic ensures that the contrast resolution remains constant over the entire brightness area. This simplifies the image processing operations that need to be carried out in evaluation unit 8. A logarithmic image sensor of this type has been developed, for example, by the Institut für Mikroelektronik Stuttgart (IMS), Allmandring 30a, D-70569 Stuttgart, and is available under the name HDRC2-EC (High Dynamic Range CMOS Evaluation Camera).

Clearly other image sensors with non-linear conversion characteristics, having an exponential or even another variation, can also be used. The important thing is to make the best possible use of what is frequently a very narrow range when converting the light intensity to current and voltage signals, respectively. In other words, the gradient of the conversion characteristic should decrease as the intensity of the light striking the image sensor increases, thus causing the magnitude of the current and voltage signals to increase more and more slowly as the light intensity rises. This means that, compared to a linear characteristic, a larger brightness area can be mapped onto a current or voltage range of a uniform size. As a result the brightness dynamics of the image sensor increases.

The method and/or the arrangement according to the present invention are used to give the driver of a vehicle advance warning and to alert him to the need to turn on the vehicle lights, or to automatically activate the vehicle lights in advance, in particular to turn them on and possibly also off again. This makes it possible, according to the present invention, to respond to a tunnel or underpass appearing in front of the vehicle according to the situation.

Alternatively, and possibly in addition to this, the method and/or the arrangement according to the present invention are used to alert the driver of a vehicle to the need to turn the vehicle lights on and off based on the ambient brightness measured by two-dimensional image sensor 2, or to automatically activate the vehicle lights, in particular to turn them on and possibly also off again, also based on the ambient brightness measured by two-dimensional image sensor 2. This makes it possible, according to the present invention, to respond to the variable ambient brightness caused by different factors according to the situation.

The advantage of the present invention lies in its ability to automatically measure brightness distribution in the direction of vehicle travel. This makes it possible to measure ambient brightness as well as brightness in certain areas of the vehicle surroundings. Based on these information values, the driver can be alerted to the need to activate the lights, or it may also be possible to activate the lights automatically. According to the present invention, the brightness is advantageously measured according to specific sectors. In particular, the brightness variation along the traffic lane can be measured in advance by combining the arrangement with an arrangement for detecting a traffic lane path and/or for detecting an object. This makes it possible to take into account tunnel entrances and underpasses appearing in the path of the vehicle at an early point in time.

What is claimed is:

1. A method for determining a lighting condition in front of a moving object corresponding to a motor vehicle, comprising the steps of:

causing a sensor unit to scan an area in front of the motor vehicle in a direction of vehicle travel;

causing an evaluation unit to measure a general lighting condition and the lighting condition in front of the motor vehicle in the direction of vehicle travel based on a plurality of values supplied by the sensor unit;

carrying out a brightness measurement with a two-dimensional image sensor; and generating at least one information value relating to the lighting condition in front of the motor vehicle in accordance with at least one of a sectoral evaluation and a global evaluation of a brightness value measured by the two-dimensional image sensor in respective sectors, wherein the two-dimensional image sensor corresponds to one of a logarithmic image sensor and an image sensor with a non-linear conversion characteristic.

2. The method according to claim 1, wherein:

the two-dimensional image sensor corresponds to a CMOS image sensor.

3. The method according to claim 1, further comprising the step of:

measuring a brightness by averaging a pixel brightness in measurement windows.

4. The method according to claim 1, further comprising the step of:

combining the brightness measurement with an automatic traffic lane tracking system to selectively measure ambient brightness in a path of a traffic lane.

5. The method according to claim 1, further comprising the step of:

combining the brightness measurement with an object detection arrangement to detect a specific object located in a traffic lane path and to take the specific object into account during the brightness measurement.

6. The method according to claim 5, wherein:

the specific object corresponds to a truck.

7. The method according to claim 1, further comprising a performance of one of the steps of:
   providing a driver of the motor vehicle with an advance warning to alert the driver to turn on a vehicle light; and
   automatically activating the vehicle light in advance by turning the vehicle light on.

8. The method according to claim 1, further comprising a performance of one of the steps of:
   alerting a driver of the motor vehicle to turn a vehicle light on and off based on an ambient brightness measured by the two-dimensional image sensor; and
   automatically activating the vehicle light based on the ambient brightness.

9. An arrangement for determining a lighting condition in front of a moving object corresponding to a motor vehicle, comprising:
   a two-dimensional image sensor onto which an area in front of the motor vehicle is mapped and that generates at least one information value relating to the lighting condition in front of the motor vehicle; and
   an evaluation unit for performing at least one of a sectoral evaluation and a global evaluation of a brightness value, wherein the two-dimensional image sensor corresponds to one of a logarithmic image sensor and an image sensor with a non-linear conversion characteristic;
   wherein the two-dimensional image sensor supplies the at least one information value to the evaluation unit.

10. The arrangement according to claim 9, wherein:
    the two-dimensional image sensor corresponds to a CMOS image sensor.

11. The arrangement according to claim 9, further comprising one of:
    an arrangement for providing a driver of the motor vehicle with an advance warning to alert the driver to turn on a vehicle light; and
    an arrangement for automatically activating the vehicle light in advance by turning the vehicle light on.

12. The arrangement according to claim 9, further comprising one of:
    an arrangement for alerting a driver of the motor vehicle to turn a vehicle light on and off based on an ambient brightness measured by the two-dimensional image sensor; and
    an arrangement for automatically activating the vehicle light based on the ambient brightness.

* * * * *